United States Patent Office 2,771,478
Patented Nov. 20, 1956

2,771,478

PRODUCTION OF CARBOXYLIC ACID ESTERS

Walter Reppe, Ludwigshafen (Rhine), Herbert Friederich, Worms, and Klaus Wiebusch, Heidelberg, Germany, assignors to Badische Anilin- & Soda-Fabrik Aktiengesellschaft, Ludwigshafen (Rhine), Germany No Drawing. Application August 12, 1952,
Serial No. 304,018

Claims priority, application Germany September 8, 1951

7 Claims. (Cl. 260—406)

The present invention relates to the production of carboxylic acid esters by the interaction of olefinic hydrocarbons with carbon monoxide and aliphatic alcohols.

It is known that carboxylic acid esters are formed when alcohols are treated with a mixture of an olefinic hydrocarbon and carbon monoxide at elevated temperature and under super-atmospheric pressure. Various catalysts have been suggested for this carbonylation reaction. It has formerly been found that the metals capable of forming metal carbonyls or their compounds are among the most active catalysts (see Walter Reppe, "Neue Entwicklungen auf dem Gebiete der Chemie des Acetylens und Kohlenoxyds," Springer–Verlag, 1949).

It is an object of the present invention to improve the above-mentioned carbonylation by providing novel catalysts. Metals capable of forming metal carbonyls and their normal compounds tend to form metal carbonyls in the course of the carbonylation reaction. These carbonyls are dissolved in the reaction product, and it is difficult to use the catalysts immediately again for the same process. It is an object of our invention to provide a catalyst which may be used repeatedly without losing substantial amounts thereof by carbonyl formation.

We have now found that the reaction between olefins, alcohols and carbon monoxide proceeds very smoothly even under relatively mild conditions when using as the catalyst a combination of cyanide anions and nickel or cobalt in complex combination. The carbonylation according to our invention is carried out in the liquid phase and with the catalyst in a dissolved state.

It is possible to use catalysts, wherein the cyanide anions and the complex metal atoms are within the same molecule. For example, we may use complex cyanides of nickel or cobalt containing organic radicals in the cation. Such compounds are for example the salts of nickel cyano hydride with aliphatic amines, in particular tertiary or quaternary aliphatic ammonium compounds. Such complex salts correspond to the general formula $$[NX_4]_2[Me(CN)_4]$$

wherein at least one, preferably three of four of the X stands for an aliphatic radical, the other being hydrogen. To cite a few examples of such compounds, we mention triethyl ammonium nickel cyanide, trimethyl butyl ammonium nickel cyanide, tetra ethyl ammonium nickel cyanide and triethyl butyl ammonium nickel cyanide and the corresponding cobalt cyanides.

Instead of using the ready-made complex compounds as catalysts, we may as well add their components to the reaction mixture, e.g. a mixture of triethyl amine or any other trialkyl amine, hydrogen cyanide and nickel carbonyl, which mixture will form triethyl ammonium nickel cyanide while splitting off of carbon monoxide and hydrogen.

Instead of using catalysts containing both the cyanide anion and the complex metal atom in one molecule, we may also use mixtures of nickel or cobalt compounds soluble in the reaction mixture with alkali metal or ammonium cyanides. We leave it open whether these components form a compound containing both cyanide anion and metal atom in the same molecule. Nickel carbonyl and triaryl phosphine substituted nickel carbonyls are the preferred compounds for this type of catalytic material.

We have found that the best results are obtained with catalysts, wherein the ratio between the complex metal atom and the cyanide anion is at least 1:4.

The reaction may be carried out with the aid of the aforesaid catalysts under relatively mild conditions. Generally speaking, we may work at temperatures between 80° and 200° C., the range between 100° and 180° C. being preferred. The pressures used are those conventionally employed in carbonylation reactions. They should be at least 50 atmospheres, preferably between 200 and 300 atmospheres, or even higher, say 500 or 700 atmospheres, provided the necessary compressors and the high pressure equipment are available.

Since the reaction is carried out in the liquid phase, it is not necessary to use an additional solvent because the alcohol used as starting material may act as the solvent together with the reaction product which is formed in the course of the reaction. We may, however, use additional solvents, in particular the esters formed in the reaction. If the catalyst or the mixture of catalytic components, is difficultly soluble in the alcohol, we may also add water as a solvent. However, in order to avoid the formation of free carboxylic acid, it is perferred to keep the amount of water present below 50 percent calculated on the amount of alcohol.

The reaction may be carried out batchwise or continuously. In the latter case we may lead a solution of the catalyst in the alcohol through a high pressure tube and introduce an olefin-carbon monoxide mixture in direct or counter current.

Ethylene is the preferred olefin in the reaction. The next higher homologues of ethylene are also suitable for their activity is lower than that of ethylene. We prefer to use the ethylene in an equal amount by volume of the carbon monoxide. Good results are also obtained if either one of these components is used in an excess up to 60 percent.

Among the alcohols to be used as starting materials methanol is most reactive. The next higher homologues of methanol, in particular ethanol, and the propanols and butanols may also be converted into esters according to the present invention.

Generally speaking, the reaction products obtained with the aid of the above-mentioned catalysts are carboxylic acid esters. A substantial part of these esters consist of those derived from a carboxylic acid containing one carbon atom more than the olefin. That means in the case of ethylene and methanol we obtain propionic acid methyl ester. Other reaction products obtained are ketocarboxylic acid esters. Free carboxylic acids and ketocarboxylic acids may also be formed. Sometimes it has been observed that also ketones are formed, for example diethyl ketone.

The following examples will further illustrate how our invention may be carried out in practice.

*Example 1*

In a stirring autoclave of 4.5 liters made from stainless steel a mixture of 1050 grams of methanol, 150 grams of nickel carbonyl, 150 grams of potassium cyanide and 300 grams of water are charged with 80 atmospheres of a mixture containing equal amounts by volume of ethylene and carbon monoxide. The temperature is then raised to 130° C. and the pressure increased to 200 atmospheres and maintained at this level by continuously replenishing the gas mixture. After about 30 hours gas mixture is no longer absorbed. The autoclave is allowed to cool, the pressure released and the reaction mixture distilled under normal pressure. The first fraction (B. P. 63° C.) consists of propionic acid methyl ester in azeotropic mixture with methanol. The next fraction is unchanged methanol, and a final fraction consists of water, methanol and some diethyl ketone.

The distillation residue is extracted with ether, the extract dried with sodium sulfate, the ether removed and the residue distilled at 18° millimeters' mercury gauge. A small amount of free propionic acid is obtained as the first fraction. The next fraction (B. P. 98° C.) is propionyl propionic acid methyl ester. The next fraction (B. P. 140°–160° C.) is dioxo pelargonic acid methyl ester. A still higher boiling fraction is obtained which consists of polyketocarboxylic acid methyl esters of unknown constitution.

Of the various products the following yields were obtained:

758 grams of propionic acid methyl ester
250 grams of propionyl propionic acid methyl ester
100 grams of dioxo pelargonic acid methyl ester
50 grams of higher polyketocarboxylic acid ester In addition to these products, 15 grams of diethyl ketone are obtained. The aqueous residue left after ether extraction contains about 50 grams of carboxylic acids in the form of their potassium salts.

*Example 2*

A solution of 150 grams of nickel carbonyl and 150 grams of potassium cyanide in 522 grams of propionic acid methyl ester, 578 grams of methanol and 300 grams of water is treated with ethylene and carbon monoxide in the manner described in Example 1. The reaction mixture is worked up in the same manner. The following products were obtained:

105 grams of propionic acid methyl ester
(+522 grams of starting propionic acid methyl ester)
110 grams of propionyl propionic acid methyl ester
32 grams of esters of higher polyketocarboxylic acids In addition thereto a small amount of diethyl ketone and about 150 grams of free carboxylic acids could be isolated.

*Example 3*

A solution of 100 grams of potassium cyanide and 100 grams of nickel carbonyl in 1100 grams of ethanol and 300 grams of water are treated with ethylene and carbon monoxide in the manner described in Example 1.

The following products were isolated from the reaction mixture:

360 grams of propionic acid ethyl ester
160 grams of propionyl propionic acid ethyl ester
91 grams of esters of higher polyketocarboxylic acids

*Example 4*

A mixture of 200 grams of di(triethyl ammonium) nickel-tetracyanide

[(C₂H₅)₃NH]₂·[Ni(CN)₄]

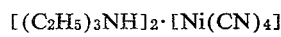

1500 grams of methanol and 70 grams of water are treated at 150° C. with ethylene and carbon monoxide in the manner described in Example 1.

The following products were obtained:

590 grams of propionic acid methyl ester
190 grams of propionyl propionic acid methyl ester
100 grams of dioxo pelargonic acid methyl ester
50 grams of esters of higher polyketocarboxylic acids The catalyst deposits as a crystallized mass after having distilled off the unchanged alcohol. It may be filtered off and used again for a new batch.

We claim:

1. In the production of carboxylic acid esters by the interaction of olefinic hydrocarbons with carbon monoxide and aliphatic alcohols in the presence of compounds of carbonyl-forming metals, the step which comprises carrying out the reaction in a liquid medium having dissolved a catalyst comprising both nickel carbonyl and a member selected from the group consisting of alkali metal cyanides and ammonium cyanide.

2. In the production of carboxylic acid esters by the interaction of olefinic hydrocarbons with carbon monoxide and aliphatic alcohols in the presence of compounds of carbonyl-forming metals, the step which comprises carrying out the reaction in a liquid medium having dissolved a catalyst comprising both nickel carbonyl and a member selected from the group consisting of alkali metal cyanides and ammonium cyanide, the ratio between nickel atoms and cyanide anions being at least 1:4.

3. The process for the production of carboxylic acid esters which comprises treating with carbon monoxide under a pressure exceeding 50 atmospheres and at a temperature between 80 and 200° C. a mixture of ethylene and an aliphatic alcohol in the presence of a catalyst comprising both nickel carbonyl and a member selected from the group consisting of alkali metal cyanides and ammonium cyanide.

4. A process as set forth in claim 3, wherein methanol is the aliphatic alcohol.

5. In the production of carboxylic acid esters by the interaction of olefinic hydrocarbons with carbon monoxide and aliphatic alcohols in the presence of compounds of carbonyl-forming metals the step which comprises carrying out the reaction in a liquid medium having dissolved a catalyst comprising nickel carbonyl admixed with an alkali metal cyanide, the ratio between the nickel atoms and the cyanide anion in the mixture being at least 1:4.

6. The process for the production of carboxylic acid esters which comprises treating with carbon monoxide under a pressure exceeding 50 atmospheres and at a temperature between 80 and 200° C. a mixture of ethylene and an aliphatic alcohol in the presence of a mixture of nickel carbonyl with an alkali metal cyanide, the ratio between the nickel atoms and the cyande anion in the mixture being at least 1:4.

7. A process as set forth in claim 6, wherein methanol is the aliphatic alcohol.

References Cited in the file of this patent

UNITED STATES PATENTS

| | | |
|---|---|---|
| 2,562,393 | Reppe | July 31, 1951 |
| 2,577,208 | Reppe | Dec. 4, 1951 |
| 2,604,490 | Reppe | July 22, 1952 |

OTHER REFERENCES

Acetylene Chemistry, Reppe P. B. Report 18852–S, Chas. A. Meyer & Co., N. Y. (1949), pp. 158 and 168.

Acetylene and Carbon Monoxide Chemistry, Copenhaver and Bigelow, Reinhold (1949), p. 271.